Patented Mar. 7, 1933

1,900,680

UNITED STATES PATENT OFFICE

HEINRICH W. WITZEL, OF INGRAM, PENNSYLVANIA, ASSIGNOR TO THE SELDEN COMPANY, OF PITTSBURGH, PENNSYLVANIA, A CORPORATION OF DELAWARE

PURIFICATION OF CRUDE MALEIC ACIDS

No Drawing. Application filed July 21, 1931. Serial No. 552,194.

Crude maleic acid, particularly when obtained as a by-product from the catalytic oxidation of naphthalene to phthalic anhydride, is ordinarily obtained in water solution and is highly colored. I have found that the color consists of iron salts of maleic acid and a colored dyestuff of undetermined constitution. Attempts to purify crude maleic acid by use of adsorbents such as adsorbent carbon and the like were not successful. According to the present invention a water solution of crude maleic acid is treated with a cyanide or a ferrocyanide, the iron being precipitated and on filtration and concentration a white or only fairly colored maleic acid can be recovered. The reason why the coloring matter containing the iron maleate, which is not adsorbed in the presence of iron, but which appears to be removed with the iron by treatment with a cyanogen compound, is not as yet determined.

When an alkali cyanide or ferrocyanide is used the maleic acid obtained is contaminated with a small amount of alkali metal acid maleate. This disadvantage can be obviated by using nascent ferrocyanic acid or by adding sufficient mineral acid, such as sulfuric or hydrochloric acid to the filtrate to neutralize all of the base present.

The invention will be described in greater detail in conjunction with the following specific examples.

Example 1

A water solution of crude maleic acid obtained as a by-product from the catalytic vapor phase air-oxidation of naphthalene to phthalic anhydride and which contains iron maleate and other colored impurities, is treated with sufficient sodium cyanide or sodium ferrocyanide to unite with all of the iron present and it is then filtered from the precipitate with or without the help of filtering charcoal, which charcoal, of course, should be free from iron. The filtrate is then treated with sufficient powerful mineral acid to unite with all of the alkali introduced by the cyanide and evaporated to a point at which most of the maleic acid crystallizes out on cooling. This product is filtered and constitutes a pure white maleic acid of good purity.

Example 2

A crude maleic acid, obtained by the catalytic oxidation of benzene, is treated as in Example 1 and an excellent grade of pure white maleic acid is obtained.

Example 3

A crude maleic acid, such as that described in Example 1, is treated with sufficient calcium ferrocyanide and sulfuric acid to form an amount of nascent ferrocyanic acid sufficient to unite with all of the iron. Thereupon it is filtered as described in Example 1, and the filtrate concentrated, and the maleic acid crystallized out. A white product is obtained and it is unnecessary to treat the filtrate with mineral acid as no soluble alkali is introduced, the calcium of the calcium ferrocyanide, of course, being transformed into the insoluble calcium sulfate and being removed with the iron ferrocyanide precipitate.

What is claimed as new is:

1. A method of purifying crude maleic acid obtained as a by-product in the catalytic air-oxidation of naphthalene to phthalic anhydride and containing iron compounds as impurities, which comprises subjecting a water solution of the crude acid to the action of an amount of an inorganic, water soluble cyanide sufficient to react with all of the iron present, filtering and crystallizing out the purified acid from the filtrate.

2. A method according to claim 1, in which the cyanogen compound is included in the group consisting of alkali metal cyanides, alkali metal ferrocyanides and the filtrate is treated with a sufficient amount of a strong mineral acid to unite with all of the alkali metal introduced with the cyanogen compound.

3. A method according to claim 1, in which the cyanogen compound is nascent ferrocyanic acid obtained by the action of sulfuric acid on an alkaline earth metal ferrocyanide.

Signed at Pittsburgh, Pennsylvania, this 20th day of July 1931.

HEINRICH W. WITZEL.